(12) United States Patent
Ho et al.

(10) Patent No.: US 10,965,137 B2
(45) Date of Patent: Mar. 30, 2021

(54) CHARGING DEVICE AND CHARGING METHOD THEREOF

(71) Applicant: CYBER POWER SYSTEMS, INC., Taipei (TW)

(72) Inventors: Lien-Hsun Ho, Taipei (TW); Heng-Chuan Chen, Taipei (TW); Che-Wei Liang, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 617 days.

(21) Appl. No.: 15/812,575

(22) Filed: Nov. 14, 2017

(65) Prior Publication Data
US 2019/0089165 A1 Mar. 21, 2019

(30) Foreign Application Priority Data

Sep. 15, 2017 (CN) .......................... 201710831178.4

(51) Int. Cl.
*H02J 7/00* (2006.01)
(52) U.S. Cl.
CPC ................ *H02J 7/007* (2013.01); *H02J 7/00* (2013.01)
(58) Field of Classification Search
CPC ........ H02J 7/008; H02J 7/0073; H02J 7/0081; Y02E 60/12; H01M 10/44
See application file for complete search history.

(56) References Cited

U.S. PATENT DOCUMENTS

| | | | | |
|---|---|---|---|---|
| 5,408,170 A | * | 4/1995 | Umetsu ................. | H02J 7/0086 320/148 |
| 2009/0189571 A1 | * | 7/2009 | Lai ......................... | H02J 7/022 320/162 |
| 2010/0219794 A1 | * | 9/2010 | Sugimoto .............. | B60L 50/40 320/128 |
| 2012/0032504 A1 | * | 2/2012 | Akimasa ............... | H01M 10/44 307/9.1 |
| 2013/0314039 A1 | * | 11/2013 | Weber .................... | B60L 53/12 320/109 |
| 2015/0137594 A1 | * | 5/2015 | Yamazaki ............. | H01M 10/44 307/10.1 |
| 2015/0171740 A1 | * | 6/2015 | Seong ................... | H02M 1/4208 320/162 |
| 2016/0236581 A1 | * | 8/2016 | Tashiro ................. | B60L 58/14 |

* cited by examiner

*Primary Examiner* — Arun C Williams
(74) *Attorney, Agent, or Firm* — Bacon & Thomas, PLLC

(57) ABSTRACT

A charging device including a converter and a controller coupled with the converter is provided. The charging device is suitable for charging to an electronic device having a rated input voltage value. The converter can receive a power. Wherein, the controller makes the converter to output a first charging voltage value to the electronic device. The first charging voltage value is greater than the rated input voltage value of the electronic device. Further, a charging method of the charging device is provided.

36 Claims, 2 Drawing Sheets

CHARGING DEVICE AND CHARGING METHOD THEREOF

BACKGROUND OF THE INVENTION

Field of the Invention

The present invention relates to a charging device and a charging method thereof, and more particularly, the present invention is relates to a charging device and a charging method thereof with quick charging function.

Description of Related Art

Portable devices are ubiquitous in present day. People use portable devices for performing variety of such as wireless communication, data computing, surfing the Internet, running specialised applications, gaming, etc. Portable devices include but are not limited to mobile phones, tablet computers, laptop PC's, PDA's, etc.

Due to the size of these portable devices, the power source for these devices, e.g., an internal battery, is often small and of limited capacity. As a result, the battery of a portable device may have to be frequently charged in order to keep the portable device operational. Thus, the charging speed of the charging device of the portable device is very important.

SUMMARY OF THE INVENTION

Accordingly, an object of the present invention is to provide a charging device and a charging method thereof for charging quickly.

To achieve the foregoing and other objects, a charging device is provided. The charging device is used for charging to an electronic device. The electronic device has a rated input voltage value. The charging device includes a converter and a controller. The converter can receive a power. The controller is coupled to the converter. Wherein, the controller makes the converter output a first charging voltage value to the electronic device, the first charging voltage value is greater than the rated input voltage value.

In one embodiment of the present invention, the first charging voltage value is the upper limit value of input voltage which the electronic device can tolerate or at least 1.03 times the rated input voltage value.

In one embodiment of the present invention, the charging device further includes a connecting wire and a first electrically connected terminal, and the electronic device has a second electrically connected terminal, the connecting wire is coupled between the first electrically connected terminal and the second electrically connected terminal, wherein the first charging voltage value is a sum of the upper limit value of input voltage which the electronic device can tolerate and the voltage drop of the connecting wire.

In one embodiment of the present invention, there is no any message transmitted between the first electrically connected terminal and the second electrically connected terminal.

In one embodiment of the present invention, when the electronic device is charged by the charging device, the electronic device has a maximum charging current value; when a instant charging current value of the electronic device is smaller than the maximum charging current value and the difference between the instant charging current values of the electronic device within a predetermined time is greater than a predetermined proportion of the maximum charging current value, or when a instant charging current value of the electronic device is smaller than the predetermined proportion of the maximum charging current value, the first charging voltage value outputted by the converter is adjusted to a second charging voltage value by activation of the controller.

In one embodiment of the present invention, when the electronic device is charged by the charging device, the electronic device has a maximum charging current value; when a instant charging current value of the electronic device is smaller than the maximum charging current value and the difference between the instant charging current values of the electronic device within a predetermined time is greater than a first predetermined proportion of the maximum charging current value, or when a instant charging current value of the electronic device is smaller than a second predetermined proportion of the maximum charging current value, the first charging voltage value outputted by the converter is adjusted to a second charging voltage value by activation of the controller.

In one embodiment of the present invention, the charging device further includes a feedback circuit and a PWM controller, the PWM controller is coupled to the converter, and the feedback circuit is coupled between the controller and the PWM controller.

In one embodiment of the present invention, the converter has an input terminal and an output terminal, the feedback circuit is coupled between the output terminal and a ground terminal, the feedback circuit has a first resistor and a second resistor, the first resistor is coupled to the output terminal, and the second resistor is coupled between the first resistor and the ground terminal.

In one embodiment of the present invention, the charging device further includes a third resistor coupled between a first node and the ground terminal, wherein the first node is coupled between the controller and the first electrically connected terminal.

In one embodiment of the present invention, the controller is coupled to the output terminal for detecting the voltage value outputted by the converter, the feedback circuit generates a feedback signal according to the voltage value outputted by the converter, and the PWM controller detects the feedback signal for controlling the output voltage value of the converter.

In one embodiment of the present invention, a second node is coupled between the controller and the PWM controller, and the second node is coupled between the first resistor and the second resistor.

In the present invention, a charging method is further provided, which including the following steps:

providing a charging device, the charging device includes a controller and a converter, wherein the controller is coupled to the converter, and the converter receives a power;

making the charging device couple to an electronic device for charging, wherein the electronic device has a rated input voltage value; and the controller makes the converter output a first charging voltage value to the electronic device, wherein the first charging voltage value is greater than the rated input voltage value.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
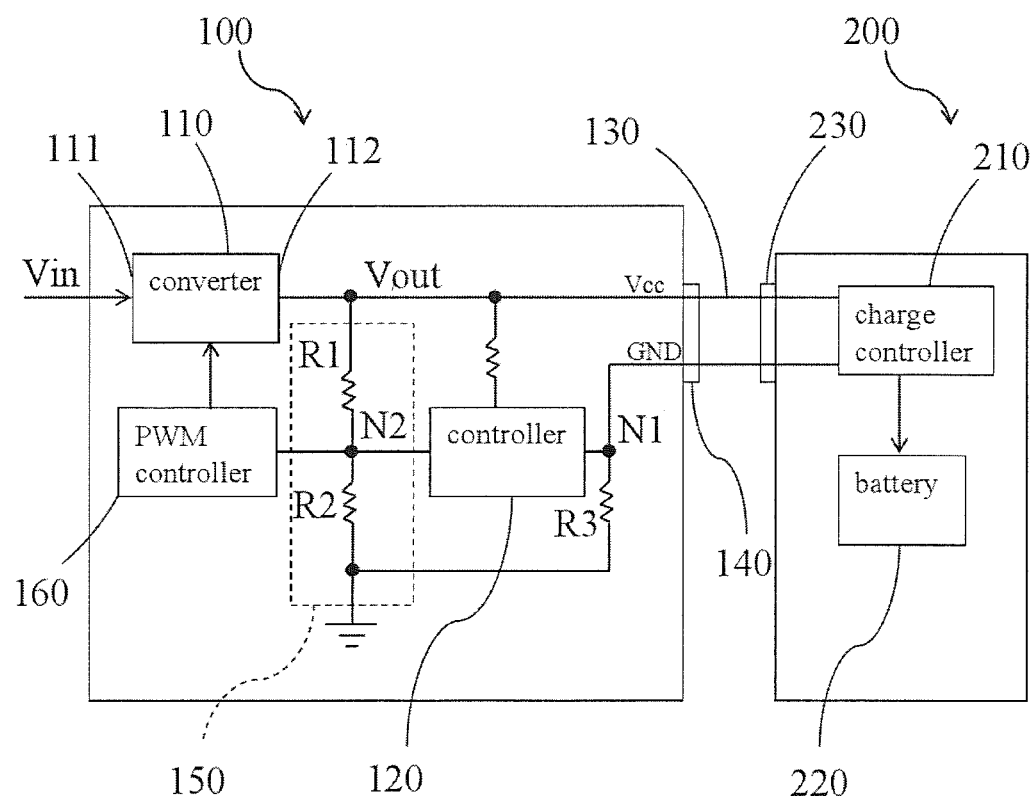
FIG. 1 is a schematic view illustrating a charging device and an electronic device according to one embodiment of the present invention.

FIG. 1 is a schematic view illustrating a charging device and an electronic device according to one embodiment of the present invention. Referring to FIG. 1, a charging device 100 of the present embodiment is suitable for charging to an electronic device 200. The electronic device 200 has a rated input voltage value. The charging device 100 includes a converter 110 and a controller 120. The converter 110 has an input terminal 111 and an output terminal 112, for example. The converter 110 can receive a power Vin through the input terminal 111. The controller 120 is, for example, coupled to the output terminal 112 of the converter 110. In addition, the electronic device 200 includes, for example, a charge controller 210 and a battery 220.

Worth mention, in the present embodiment, the controller 120 can make the converter 110 output a first charging voltage value to the electronic device 200, and the first charging voltage value is greater than the rated input voltage value. Wherein, the first charging voltage value is, for example, the upper limit value of input voltage which the electronic device 200 can tolerate or at least 1.03 times the rated input voltage value. For example, the first charging voltage value can be the upper limit value of input voltage which the electronic device 200 can tolerate. Besides, the first charging voltage value also can be 1.03-1.1 times the rated input voltage value of the electronic device 200. In addition, the electronic device 200 can be a mobile phone. The rated input voltage value of the mobile phone is, for example, 5V. Thus, the first charging voltage value of the present embodiment is, for example, 5.25V. Wherein, the electronic device of the present embodiment is exemplified as the mobile phone, and the present invention will not be limited to this.

In addition, in the present embodiment, the charging device 100 further can include a connecting wire 130 and a first electrically connected terminal 140. The electronic device 200 has, for example, a second electrically connected terminal 230. The connecting wire 130 is coupled between the first electrically connected terminal 140 and the second electrically connected terminal 230. Wherein, the first charging voltage value also can be a sum of the upper limit value of input voltage which the electronic device 200 can tolerate and the voltage drop at connecting wire 130. Where the first charging voltage value is greater than the rated input voltage value of the charging device 100 is within the spirit and scope of the present invention, and is not intended to be limiting herein.

On the other hand, in the present embodiment, when the charging device 100 is used to charge for the electronic device 200, the electronic device 200 has, for example, a maximum charging current value. The maximum charging current value is, for example, a maximum current value detected during the charging time. Thus, when one instant charging current value of the electronic device 200 is smaller than the maximum charging current value and the difference between the instant charging current values of the electronic device 200 within a predetermined time is greater than a predetermined proportion of the maximum charging current value, the first charging voltage value outputted by the converter 110 is adjusted to a second charging voltage value by activation of the controller 120. The level of the second charging voltage value can be set according to the actual demand. In other words, the second charging voltage value can be greater than the first charging voltage value or smaller than the first charging voltage value. Even, the second charging voltage value can be smaller than the first charging voltage value and the rated input voltage value. For example, when one instant charging current value of the electronic device 200 is smaller than a predetermined proportion (the range of predetermined proportion is, for example, between 0.4-0.6 times) of maximum charging current value and the difference between the instant charging current values of the electronic device 200 within a predetermined time is greater than another predetermined proportion (this range of predetermined proportion is, for example, between 0.1-0.2 times) maximum charging current value, the controller 120 can activate the converter 110. Thus, the first charging voltage value can be dropped to a second charging voltage value. At this time, the second charging voltage value, is for example, 0.9-0.97 times rated input voltage value of the electronic device 200. Therefore, the effect of energy saving can be achieved. One more practical example is that: when the electronic device 200 such as mobile phone is charged by the charging device 100 in 5.25V, the first charging voltage value outputted by the converter 110 will be dropped to a second charging voltage value by activation of the controller 120 if the instant charging current value of the electronic device 200 is smaller than 0.8 Å and the difference between the instant charging current values of the mobile phone before and after 10 minutes is greater than 0.3 Å. Wherein, the first charging voltage value is, for example, 5.25V. The second charging voltage value is, for example, 4.8V.

In one preferred embodiment, when one instant charging current value of the electronic device 200 is smaller than the foregoing proportion (this range of foregoing proportion is, for example, between 0.1-0.2 times) maximum charging current value, or when one instant charging current value of the electronic device 200 is smaller than another proportion (this range of proportion is, for example, 0.3 times) maximum charging current value, the first charging voltage value outputted by the converter 110 also can adjusted to a second charging voltage value through the activation of the controller 120. Similarly, the level of the second charging voltage value can be set according to the actual demand. In other words, the second charging voltage value can be greater than the first charging voltage value. Besides, the second charging voltage value also can be smaller than the first charging voltage value. Even, the second charging voltage value can be smaller than the first charging voltage value and the rated input voltage value. For example, the second charging voltage value can be 0.9-0.97 times rated input voltage value of the electronic device 200. One more practical example is that: when the electronic device 200 such as mobile phone is charged by the charging device 100 in 5.25V, the first charging voltage value outputted by the converter 110 will be dropped to a second charging voltage value by activation of the controller 120 if the instant charging current value of the electronic device 200 is smaller than 0.3 Å. Wherein, the first charging voltage value is, for example, 5.25V. The second charging voltage value is, for example, 4.8V. Besides, the above state which the first charging voltage value outputted by the converter 110 drops to the second charging voltage value is, for example, the charging state of the electronic device 200 which has been completed by nearly 80% to 90%. It is understood that the above description is for exemplary only, and the present invention is not limited thereto.

In the present embodiment, the charging device 100 further includes a feedback circuit 150 and a PWM controller 160. In the present embodiment, the PWM controller 160 is coupled to the converter 110, and the feedback circuit 150 is coupled between the controller 120 and the PWM controller 160. In addition, the feedback circuit 150 is coupled between the output terminal 112 of the converter 110 and a ground terminal.

From above, the feedback circuit 150 of the present embodiment has a first resistor R1 and a second resistor R2. The first resistor R1 is coupled to the output terminal 112, and the second resistor R2 is coupled between the first resistor R1 and the ground terminal. Further, in the present embodiment, a second node N2 is coupled between the first resistor R1 and the second resistor R2. The second node is also coupled between the controller 120 and the PWM controller 160.

Worth mention, in the present embodiment, the controller 120 is coupled to the output terminal 112 of the converter 110. For example, the controller 120 is coupled to the output terminal 112 of the converter 110 through one resistor. Thus, the controller 120 can detect the voltage value outputted by the converter 110. The feedback circuit 150 can generate a feedback signal according to the voltage value outputted by the converter 110. Further, the PWM controller 160 can control the output voltage value Vout outputted by the converter 110 according to the feedback signal. In the present embodiment, when the controller 120 determines that the output voltage value Vout outputted by the converter 110 is lower than a default outputting target-level voltage (like 5.25V), the controller 120 will output a voltage to the second node N2. At this time, the output voltage of the controller 120 is smaller than the partial voltage at second node N2 for lowering the voltage at the second node N2. Further, the PWM controller 160 can control the converter 110 to raise its output voltage value Vout. On the contrary, when the controller 120 determines that the output voltage value Vout of the converter 110 is higher than the default outputting target-level voltage (like 5.25V), the controller 120 will outputs one voltage to the second node N2. At this time, the output voltage of the controller 120 is greater than the partial voltage at second node N2 for raising the voltage at the second node N2. Further, the PWM controller 160 can control the converter 110 to lower its output voltage value Vout.

In the present embodiment, the charging device 100 further can include a third resistor R3. The third resistor R3 is coupled between a first node N1 and the ground terminal, and the first node N1 is coupled between the controller 120 and the first electrically connected terminal 140. Therefore, in the controller 120 of the present embodiment, the instant charging current value of the electronic device 200 can be obtained through detecting the voltage at first node N1.

In one embodiment, there is no any message transmitted between the first electrically connected terminal 140 and the second electrically connected terminal 230. For example, only pin VCC and pin GND are configured in the first electrically connected terminal 140. In other words, there is no pin like D+ or D− for transmitting any message or communication. In other embodiment. The first electrically connected terminal 140 also can be configured with other pins expect pin VCC and pin GND, wherein these pins are dummy pins without transmitting or communicating function. In another preferred embodiment, the foregoing pins also can be applied in identifying mechanism for charging to the electronic device 200, and the present invention will not be limited to this.

Worth mention, the converter 110 can be a AC/DC converter, such as a flyback converter. In addition, the converter 110 also can be DC/DC converter, such as a buck converter, a boost converter, or a buck-boost converter etc.

Figure 2:
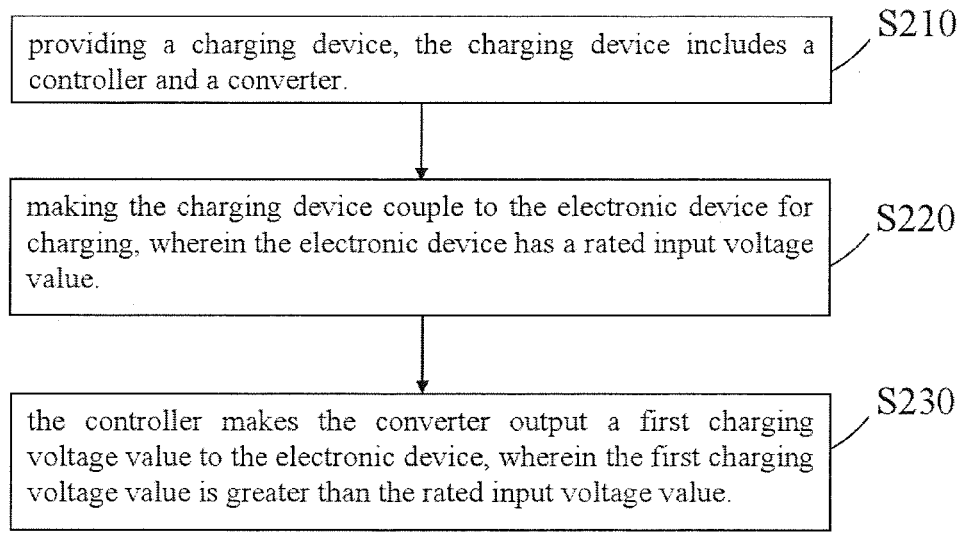
FIG. 2 is a flow chart illustrating a charging method of charging device according to one embodiment of the present invention.

FIG. 2 is a flow chart illustrating a charging method of charging device according to one embodiment of the present invention. Referring to FIG. 2, the charging method of the present embodiment includes the following steps: Firstly, in step S210, providing a charging device, the charging device includes a controller and a converter. Wherein, the controller is coupled to the converter, and the converter 110 can receives a power. Next, in S220, making the charging device couple to the electronic device for charging, wherein the electronic device has a rated input voltage value. Next, in S230, the controller makes the converter output a first charging voltage value to the electronic device, wherein the first charging voltage value is greater than the rated input voltage value.

Worth mention, in the charging method of the present invention, when one instant charging current value of the electronic device 200 is smaller than the maximum charging current value and the difference between instant charging current values of the electronic device 200 within a predetermined time is greater than a predetermined proportion of maximum charging current value, the first charging voltage value outputted by the converter 110 will be adjusted to a second charging voltage value by activation of the controller 120. Besides, when one instant charging current value of the electronic device 200 is smaller than the predetermined proportion of maximum charging current value or when one instant charging current value of the electronic device 200 is smaller than another predetermined proportion of maximum charging current value, the first charging voltage value outputted by the converter 110 also can be adjusted to the second charging voltage value by activation of the controller 120.

Specifically, in the charging device 100 of the present embodiment, the rated input voltage value of the electronic device 200 can be obtained through external set or internal sense. For example, users can set the rated input voltage value of the electronic device 200 in the charging device 100 according to operating specification of the electronic device 200. In one embodiment, the rated input voltage value of the electronic device 200 has been pre-set in the charging device 100. Certainly, the charging device 100 can be configured with a sensing device (not shown) for sensing the rated input voltage value of the electronic device 200 automatically when the charging device 100 and the electronic device 200 are coupled. It is understood that the above description is for exemplary only, and the present invention is not limited thereto.

To sum up, in the charging device of the present invention, the first charging voltage value is used to charge for the electronic device, wherein the first charging voltage value outputted by the converter is greater than the rated input voltage value of the electronic device. Further, the purpose of quick charge can be achieved. In addition, in the charging device of the present invention, when the instant charging current value of the electronic device is smaller than the maximum charging current value and the difference between instant charging current values of the electronic device within the predetermined time is greater than a predetermined proportion of maximum charging current value, the first charging voltage value outputted by the converter will be adjusted to the second charging voltage value. Besides, when the instant charging current value of the electronic device is smaller than the predetermined proportion of maximum charging current value or the instant charging current value of the electronic device is smaller than another predetermined proportion of maximum charging current value, the first charging voltage value outputted by the converter also can be adjusted to the second charging voltage value.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A charging device used for charging to an electronic device, wherein the electronic device has a rated input voltage value, comprising:
   a converter, receiving a power; and
   a controller, coupled to the converter;
   wherein, the controller makes the converter output a first charging voltage value to the electronic device, the first charging voltage value being greater than the rated input voltage value;
   wherein when the electronic device is charged, the electronic device has a maximum charging current value; and
   wherein when an instant charging current value of the electronic device is smaller than the maximum charging current value and the difference between the instant charging current values of the electronic device within a predetermined time is greater than a predetermined proportion of the maximum charging current value, or when an instant charging current value of the electronic device is smaller than the predetermined proportion of the maximum charging current value, the first charging voltage value outputted by the converter is adjusted to a second charging voltage value by activation of the controller.

2. The charging device of claim 1, wherein the first charging voltage value is the upper limit value of input voltage which the electronic device can tolerate or at least 1.03 times the rated input voltage value.

3. The charging device of claim 1, further comprising a connecting wire and a first electrically connected terminal, and the electronic device has a second electrically connected terminal, the connecting wire is coupled between the first electrically connected terminal and the second electrically connected terminal, wherein the first charging voltage value is a sum of the upper limit value of input voltage which the electronic device can tolerate and the voltage drop of the connecting wire.

4. The charging device of claim 3, wherein there is no any message transmitted between the first electrically connected terminal and the second electrically connected terminal.

5. The charging device of claim 1, further comprising a feedback circuit and a PWM controller, the PWM controller is coupled to the converter, and the feedback circuit is coupled between the controller and the PWM controller.

6. The charging device of claim 5, wherein the converter has an input terminal and an output terminal, the feedback circuit is coupled between the output terminal and a ground terminal, the feedback circuit has a first resistor and a second resistor, the first resistor is coupled to the output terminal, and the second resistor is coupled between the first resistor and the ground terminal.

7. The charging device of claim 6, further comprising a third resistor coupled between a first node and the ground terminal, wherein the first node is coupled between the controller and the first electrically connected terminal.

8. The charging device of claim 6, wherein the controller is coupled to the output terminal for detecting the voltage value outputted by the converter, the feedback circuit generates a feedback signal according to the voltage value outputted by the converter, and the PWM controller detects the feedback signal for controlling the output voltage value of the converter.

9. The charging device of claim 6, wherein a second node is coupled between the controller and the PWM controller, and the second node is coupled between the first resistor and the second resistor.

10. A charging method, comprising:
    providing a charging device, the charging device including a controller and a converter, wherein the controller is coupled to the converter, and the converter receives a power; and
    making the charging device couple to an electronic device for charging, wherein the electronic device has a rated input voltage value;
    wherein the controller makes the converter output a first charging voltage value to the electronic device, the first charging voltage value being greater than the rated input voltage value;
    wherein when the electronic device is charged by the charging device, the electronic device has a maximum charging current value; and
    wherein when an instant charging current value of the electronic device is smaller than the maximum charging current value and the difference between the instant charging current values of the electronic device within a predetermined time is greater than a predetermined proportion of the maximum charging current value, or when an instant charging current value of the electronic device is smaller than the predetermined proportion of the maximum charging current value, the first charging voltage value outputted by the converter is adjusted to a second charging voltage value by activation of the controller.

11. The charging method of claim 10, wherein the first charging voltage value is the upper limit value of input voltage which the electronic device can tolerate or at least 1.03 times the rated input voltage value.

12. The charging method of claim 10, wherein the charging device further includes a connecting wire and a first electrically connected terminal, and the electronic device has a second electrically connected terminal, the connecting wire is coupled between the first electrically connected terminal and the second electrically connected terminal, the first charging voltage value is a sum of the upper limit value of input voltage which the electronic device can tolerate and the voltage drop of the connecting wire.

13. The charging method of claim 12, wherein there is no any message transmitted between the first electrically connected terminal and the second electrically connected terminal.

14. The charging method of claim 10, wherein the charging device further includes a feedback circuit and a PWM controller, the PWM controller is coupled to the converter, and the feedback circuit is coupled between the controller and the PWM controller.

15. The charging method of claim 14, wherein the converter has an input terminal and an output terminal, the feedback circuit is coupled between the output terminal and a ground terminal, the feedback circuit has a first resistor and a second resistor, the first resistor is coupled to the output terminal, and the second resistor is coupled between the first resistor and the ground terminal.

16. The charging method of claim 15, wherein the charging device further includes a third resistor coupled between a first node and the ground terminal, the first node is coupled between the controller and the first electrically connected terminal.

17. The charging method of claim 15, wherein the controller is coupled to the output terminal for detecting the voltage value outputted by the converter, the feedback circuit generates a feedback signal according to the voltage value outputted by the converter, and the PWM controller detects the feedback signal for controlling the output voltage value of the converter.

18. The charging method of claim 15, wherein a second node is coupled between the controller and the PWM controller, and the second node is coupled between the first resistor and the second resistor.

19. A charging device used for charging to an electronic device, wherein the electronic device has a rated input voltage value, comprising:
a converter, receiving a power; and
a controller, coupled to the converter;
wherein, the controller makes the converter output a first charging voltage value to the electronic device, the first charging voltage value being greater than the rated input voltage value;
wherein when the electronic device is charged, the electronic device has a maximum charging current value; and
wherein when an instant charging current value of the electronic device is smaller than the maximum charging current value and the difference between the instant charging current values of the electronic device within a predetermined time is greater than a first predetermined proportion of the maximum charging current value, or when an instant charging current value of the electronic device is smaller than a second predetermined proportion of the maximum charging current value, the first charging voltage value outputted by the converter is adjusted to a second charging voltage value by activation of the controller.

20. The charging device of claim 19, wherein the first charging voltage value is the upper limit value of input voltage which the electronic device can tolerate or at least 1.03 times the rated input voltage value.

21. The charging device of claim 19, further comprising a connecting wire and a first electrically connected terminal, and the electronic device has a second electrically connected terminal, the connecting wire is coupled between the first electrically connected terminal and the second electrically connected terminal, wherein the first charging voltage value is a sum of the upper limit value of input voltage which the electronic device can tolerate and the voltage drop of the connecting wire.

22. The charging device of claim 21, wherein there is no any message transmitted between the first electrically connected terminal and the second electrically connected terminal.

23. The charging device of claim 19, further comprising a feedback circuit and a PWM controller, the PWM controller is coupled to the converter, and the feedback circuit is coupled between the controller and the PWM controller.

24. The charging device of claim 23, wherein the converter has an input terminal and an output terminal, the feedback circuit is coupled between the output terminal and a ground terminal, the feedback circuit has a first resistor and a second resistor, the first resistor is coupled to the output terminal, and the second resistor is coupled between the first resistor and the ground terminal.

25. The charging device of claim 24, further comprising a third resistor coupled between a first node and the ground terminal, wherein the first node is coupled between the controller and the first electrically connected terminal.

26. The charging device of claim 24, wherein the controller is coupled to the output terminal for detecting the voltage value outputted by the converter, the feedback circuit generates a feedback signal according to the voltage value outputted by the converter, and the PWM controller detects the feedback signal for controlling the output voltage value of the converter.

27. The charging device of claim 24, wherein a second node is coupled between the controller and the PWM controller, and the second node is coupled between the first resistor and the second resistor.

28. A charging method, comprising:
providing a charging device, the charging device including a controller and a converter, wherein the controller is coupled to the converter, and the converter receives a power; and
making the charging device couple to an electronic device for charging, wherein the electronic device has a rated input voltage value,
wherein the controller makes the converter output a first charging voltage value to the electronic device, the first charging voltage value being greater than the rated input voltage value;
wherein when the electronic device is charged by the charging device, the electronic device has a maximum charging current value; and
wherein when an instant charging current value of the electronic device is smaller than the maximum charging current value and the difference between the instant charging current values of the electronic device within a predetermined time is greater than a first predetermined proportion of the maximum charging current value, or when an instant charging current value of the electronic device is smaller than a second predetermined proportion of the maximum charging current value, the first charging voltage value outputted by the converter is adjusted to a second charging voltage value by activation of the controller.

29. The charging method of claim 28, wherein the first charging voltage value is the upper limit value of input voltage which the electronic device can tolerate or at least 1.03 times the rated input voltage value.

30. The charging method of claim 28, wherein the charging device further includes a connecting wire and a first electrically connected terminal, and the electronic device has a second electrically connected terminal, the connecting wire is coupled between the first electrically connected terminal and the second electrically connected terminal, the first charging voltage value is a sum of the upper limit value of input voltage which the electronic device can tolerate and the voltage drop of the connecting wire.

31. The charging method of claim 30, wherein there is no any message transmitted between the first electrically connected terminal and the second electrically connected terminal.

32. The charging method of claim 28, wherein the charging device further includes a feedback circuit and a PWM controller, the PWM controller is coupled to the converter, and the feedback circuit is coupled between the controller and the PWM controller.

33. The charging method of claim 32, wherein the converter has an input terminal and an output terminal, the feedback circuit is coupled between the output terminal and a ground terminal, the feedback circuit has a first resistor and a second resistor, the first resistor is coupled to the output terminal, and the second resistor is coupled between the first resistor and the ground terminal.

34. The charging method of claim 33, wherein the charging device further includes a third resistor coupled between a first node and the ground terminal, the first node is coupled between the controller and the first electrically connected terminal.

35. The charging method of claim 33, wherein the controller is coupled to the output terminal for detecting the voltage value outputted by the converter, the feedback circuit generates a feedback signal according to the voltage value outputted by the converter, and the PWM controller detects the feedback signal for controlling the output voltage value of the converter.

36. The charging method of claim 33, wherein a second node is coupled between the controller and the PWM controller, and the second node is coupled between the first resistor and the second resistor.

\* \* \* \* \*